Oct. 2, 1951 C. W. BURNS 2,570,046

RECORD CABINET

Filed July 17, 1947

Inventor
Charles W. Burns
By Eli Mellin
Attorney

Patented Oct. 2, 1951

2,570,046

UNITED STATES PATENT OFFICE 2,570,046

RECORD CABINET

Charles W. Burns, Chicago, Ill.

Application July 17, 1947, Serial No. 761,595

9 Claims. (Cl. 312—15)

This invention relates to record cabinets and more particularly to partitioned cabinets which may be used for storing phonograph, dictating machine and the like disk records, and means for retaining and selectively ejecting such records from their individual cabinet compartments.

Partitioned record cabinets are well known in the art and in the past were widely used for filing and storing disk records. These cabinets were of varied and ingenious designs, but all of them possessed certain defects which prevented their more universal adoption. In fact, more recently these defects have been largely responsible for such cabinets being partially supplanted by other filing means such as albums and the like.

Among such defects, the difficulty of selecting and extricating individual records from their respective compartments was perhaps the worst fault. Many attempts to rectify this situation resulted in the introduction of numerous and varied ejecting means and methods, none of which proved very practical or successful.

On the other hand, numerous record retaining devices and structures were also developed to prevent excess record breakage resulting from these attempts to simplify record ejection. These devices likewise proved to be impractical or unsuccessful.

Hence, it is obvious that there now exists an urgent need for a partitioned record cabinet having simple, yet effective means for retaining the records, when not in use, in their respective cabinet compartments as well as means for ready, selective ejection of such records when it is desired to play them.

It is, therefore, a primary object of this invention to provide a cabinet of the character described, which will overcome all of the disadvantages set forth above.

A further object is to provide means for ejecting records from record cabinet compartments with ease and facility.

Another object is to afford in a record cabinet means for securely retaining such records in their individual compartments.

Yet a further object is to provide in a record cabinet, means to prevent record breakage while removing such records from the compartment. An object relating thereto is to provide retaining means which will grip the record while it is being extricated, and will securely hold the record until the operator forceably removes the record from the retaining means.

Yet another object is to provide in a record cabinet unitary means for both retaining the record in the compartment and for also ejecting the record when desired.

A further object is to afford means in a record cabinet for readily identifying records stored therein.

Still another object is to afford combined retaining and ejecting means which may be readily installed in a standard partitioned record cabinet.

Still a further object is to provide means in a record cabinet which will reduce record breakage resulting from jarring and vibration of the cabinet while the record is stored therein. An object pursuant thereto is to provide in a record cabinet clamping means to securely retain the record in an upright position, so that said record does not rest against the compartment walls.

A further object is to afford a record cabinet of simple inexpensive construction which will effectively retain the record therein, reduce the possibility of breakage and afford means for ready ejection of such records.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawings preferred embodiments thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings.

Figures 1, 2, 3, 4, 5, 6:
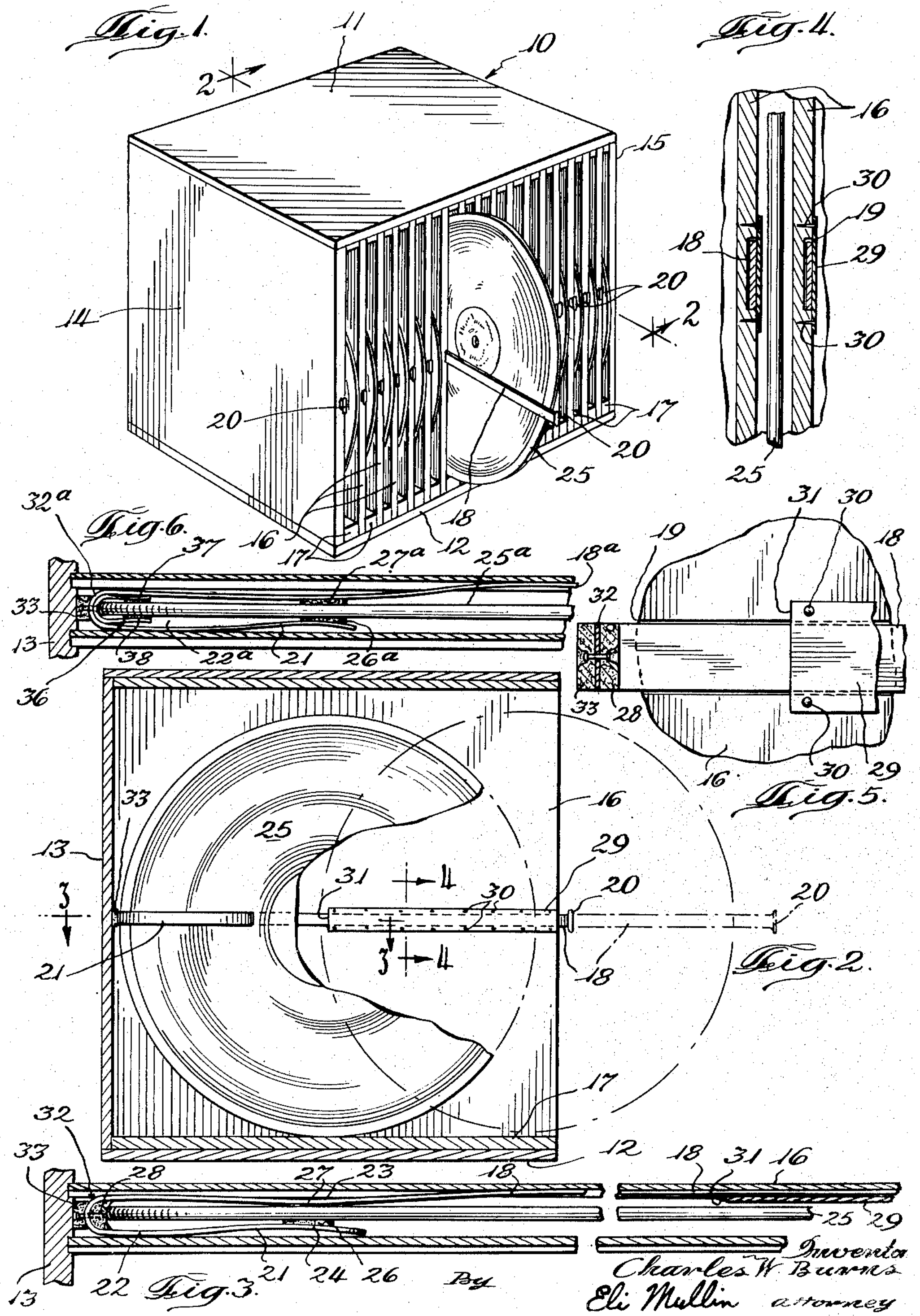
Fig. 1 is a perspective view of a record cabinet, embodying the principles of this invention.
Fig. 2 is an enlarged sectional view taken on line 2—2 in Fig. 1 viewed in the direction indicated and with part of the record contained therein broken away to permit illustration of certain constructional features.
Fig. 3 is an enlarged fragmentary sectional view taken on line 3—3 in Fig. 2 and viewed in the direction indicated.
Fig. 4 is a fragmentary sectional view taken on line 4—4 of Fig. 3 and viewed in the direction indicated.
Fig. 5 is an enlarged fragmentary view showing the wall bracket construction.
Fig. 6 is a sectional view similar to that of Fig. 3, but illustrative of a modification of this invention.

Referring more specifically to the drawings, reference numeral 10 designates generally a record cabinet partitioned into individual record compartments for storing records therein. The general details of construction of the record cabinet itself are not important to this invention, but generally comprise a top 11, a bottom 12, a back wall 13 and side-walls 14 and 15. The cabinet itself is divided into a plurality of vertical compartments by parallel partition walls, such as 16. If desired deadening bottom pieces 17 may be provided in the cabinet compartments. Such deadening pieces will also serve to brace the partition walls in position.

The principal feature of this invention is embodied in a unitary retaining and ejecting member which comprises a slideable operating rod 18 positioned in a horizontal slot 19, formed in the partition wall of the compartment and spaced from the bottom thereof. The operating arm 18 has a knob or button 20 formed or affixed to its outer end. The inner end 21 is bent in an angle of 180 degrees to form a hook 22. The hook 22 may be further shaped as a clamp by proper arcuate indentations as at 23 and 24. The clamp may be imparted proper resilience by using a spring steel for its construction.

Thus, when the record 25 is inserted into the cabinet through the front of the compartment and pushed back therein, it is engaged by the clamp and retained securely therein. To prevent scratching or abrasion of the record sides, felt blocks such as 26, 27, and 28 may be affixed to the inner surfaces of clamp 22 at all points which bear against the record.

To retain operating arm 18 within the slot 19 a wall-strip 29 may be affixed over a portion of the slot in any conventional manner such as by wood screws 30. This wall strip 29 covers only the front portion of the slot so that its rear end 31 affords a brake to stop the forward motion of the arm and record when a record is extricated from the compartment.

Hence, when it is desired to remove a record, knob 20 is grasped by the operator, and operating arm 18 is pulled forward to the position indicated in dotted outline in Fig. 2. This forward motion is halted when clamp-end 32 comes in contact with strip-end 31. This stops the forward movement of the arm and record, but simultaneously retains the record in position until the operator removes the record from the clamp. Since the operating arm and clamp are made of flexible spring steel, the indentation at 23 does not halt the forward movement of the arm and record, but rather, by increased frictional resistance, brakes the ejector before it is abruptly halted by the strip-end 31. This forward movement is not stopped until bent end 32 is brought in bearing relationship with strip-end 31.

A felt block 33 may further be provided between back wall 13 and the end of clamp 22 to cushion the record when it is pushed back into the compartment. Furthermore, the buttom 20 may bear suitable indicia such as numbers, by which the respective compartments may be readily identified.

In Fig. 6 a modification of this invention is illustrated wherein similar parts are designated by like numerals with the added suffix "*a*." In this modification, operating arm 18*a* is again formed at its inner end into a clamp 22*a*. However, auxiliary clamping means are associated therewith to retain the record securely between the clamp 22*a*. This auxiliary means consists of a U-shaped clip 36 affixed to the inner end 32*a* of the clamp 22, so that when the record 25*a* is inserted therein the clip 36 clamps the rear portion of the record between its springed fingers 37 and 38.

It is believed that my invention, its mode of construction and assembly, and many of its advantages should be readily understood from the foregoing without further description, and it should also be manifest that while preferred embodiments of the invention have been shown and described for illustrative purposes, the structural details are nevertheless capable of wide variation within the purview of my invention as defined in the appended claims.

What I claim and desire to secure by Letters Patent of the United States is:

1. In a disk record cabinet comprising a plurality of individual record compartments, slidable unitary means for both retaining a record within said compartment and for ejecting said record therefrom, said means comprising an operating arm having an inner record-retaining clamp, and said clamp comprising a pair of substantially horizontally extending resilient arms for frictionally engaging therebetween portions of the sides or grooved surfaces of the record in substantially laterally immovable relationship.

2. In a disk record cabinet comprising a plurality of individual record compartments, slidable unitary means for both retaining a record within said compartment and for ejecting said record therefrom, said means comprising an operating arm having an inner record-retaining clamp and an outwardly protruding finger grasping button, and said clamp comprising a pair of substantially horizontally extending resilient arms for frictionally engaging therebetween portions of the sides or grooved surfaces of the record in substantially laterally immovable relationship.

3. In a disk record cabinet comprising a plurality of individual record compartments, slidable unitary means for both retaining a record within said compartment and for ejecting said record therefrom, said means comprising an operating arm having an inner record-retaining clamp and an outwardly protruding finger grasping button and non-abrading blocks affixed to the inner record-bearing surfaces of said clamp, and said clamp comprising a pair of substantially horizontally extending resilient arms for frictionally engaging therebetween portions of the sides or grooved surfaces of the record in substantially laterally immovable relationship.

4. In a disk record cabinet comprising a top, bottom and side walls and separated by a plurality of vertically upright partition walls into individual record compartments, unitary record-retaining and ejecting means, said partition walls having a horizontal slot formed in the side thereof in spaced relation with said bottom, and said retaining and ejecting means slidable therein.

5. In a disk record cabinet comprising a top, bottom and side walls and separated by a plurality of vertically upright partition walls into individual record compartments, unitary record-retaining and ejecting means, said partition walls having a horizontal slot formed in the side thereof in spaced relation with said bottom, said retaining and ejecting means comprising a flat bar shaped operating arm with a hook shaped record clamp formed at the inner end thereof, said operating arm slidable within said slot, and a wall-strip secured over a portion of said slot.

6. In a disk record cabinet comprising a top, bottom and side walls and separated by a plurality of vertically upright partition walls into individual record compartments, unitary record-retaining and ejecting means, said partition walls having a horizontal slot formed in the side thereof in spaced relation with said bottom, said retaining and ejecting means comprising a flat bar shaped operating arm with a hook shaped record clamp formed at the inner end thereof, said operating arm slidable within said slot, and a wall-strip secured over a front portion of said slot, the rear edge of said strip being engageable with the bent end of said clamp to halt the slidable forward movement of said ejecting means.

7. In a disk record cabinet comprising a top, bottom and side walls and separated by a plurality of vertically upright partition walls into individual record compartments, unitary record-retaining and ejecting means, said partition walls having a horizontal slot formed in the side thereof in spaced relation with said bottom, said retaining and ejecting means comprising a flat bar shaped operating arm with a hook shaped record clamp formed at the inner end thereof, said operating arm slidable within said slot, and a wall-strip secured over a front portion of said slot, the rear edge of said strip being engageable with the bent end of said clamp to halt the slidable forward movement of said ejecting means, and said clamp being formed of resilient spring steel.

8. In a disk record cabinet comprising a plurality of individual record compartments, slidable unitary means for both retaining a record within said compartment and for ejecting said record therefrom, said means comprising an operating arm having an inner record-retaining clamp, and an auxiliary record retaining clip affixed to said clamp and positioned to retain a rear portion of a record therein.

9. In a disk record cabinet comprising a top, bottom and side walls and separated by a plurality of vertically upright partition walls into individual record compartments, unitary record-retaining and ejecting means, said partition walls having a horizontal slot formed in the side thereof in spaced relation with said bottom, said retaining and ejecting means comprising an operating arm formed with an arcuate protuberance and having a hook shaped resilient clamp formed at the inner end thereof, said operating arm slidable within said slot, and a wall strip secured over a front portion of said slot, said protuberance and clamp cooperating with said wall strip to brake the forward movement of said ejecting means.

CHARLES W. BURNS.

REFERENCES CITED

The following references are of record in the file of this patent:

UNITED STATES PATENTS

| Number | Name | Date |
|---|---|---|
| 989,031 | Oliver | Apr. 11, 1911 |
| 1,069,294 | Rose | Aug. 5, 1913 |
| 1,349,272 | Foss | Aug. 10, 1920 |
| 1,429,076 | Helsley | Sept. 12, 1922 |
| 1,621,008 | Fricker | Mar. 15, 1927 |
| 2,079,754 | Waxgiser | May 11, 1937 |
| 2,513,866 | Hedstrom | July 4, 1950 |